US008501259B2

(12) United States Patent (10) Patent No.: US 8,501,259 B2
Vergara (45) Date of Patent: Aug. 6, 2013

(54) GRILL, TRAY AND CART SYSTEM TO FREEZE FOODS

(75) Inventor: Javier Ignacio Cabello Vergara, Quellón Chiloe (CL)

(73) Assignee: Yadran Quellon S.A., Quellon (CL)

( * ) Notice: Subject to any disclaimer, the term of this patent is extended or adjusted under 35 U.S.C. 154(b) by 119 days.

(21) Appl. No.: 12/615,863

(22) Filed: Nov. 10, 2009

(65) Prior Publication Data

US 2010/0181271 A1 Jul. 22, 2010

(30) Foreign Application Priority Data

Nov. 10, 2008 (CL) ...................................... 3345-08

(51) Int. Cl.
*A23B 4/06* (2006.01)
*B62B 3/00* (2006.01)
*A47F 7/00* (2006.01)
*B65D 77/20* (2006.01)
*B65D 1/34* (2006.01)

(52) U.S. Cl.
USPC ...... 426/393; 280/47.35; 211/13.1; 211/85.4; 426/396; 206/557; 206/561

(58) Field of Classification Search
USPC .............. 211/13.1, 85.4, 41.1–41.4, 119.005, 211/126.13, 126.1, 184; 280/47.35, 79.11, 280/79.3; 62/62, 251, 382; 119/203; 426/129, 426/393, 396; 206/557, 561, 564
See application file for complete search history.

(56) References Cited

U.S. PATENT DOCUMENTS

| 112,129 | A | * | 2/1871 | Davis | 426/393 |
|---|---|---|---|---|---|
| 679,474 | A | * | 7/1901 | Early | 108/1 |
| 989,566 | A | * | 4/1911 | Callaghan | 108/61 |
| 1,623,244 | A | * | 4/1927 | Hooper | 211/36 |
| 2,302,782 | A | * | 11/1942 | Loeb et al. | 312/290 |
| 2,478,458 | A | * | 8/1949 | Alpha et al. | 211/71.01 |
| 2,680,424 | A | * | 6/1954 | Brown | 119/203 |
| 2,776,215 | A | * | 1/1957 | Thomas | 426/119 |
| 2,796,213 | A | * | 6/1957 | Shanahan | 229/120.26 |
| 2,933,195 | A | * | 4/1960 | Radek | 211/153 |
| 2,936,899 | A | * | 5/1960 | Tashman | 211/85.4 |
| 3,152,912 | A | * | 10/1964 | Carruthers et al. | 426/479 |
| 3,269,547 | A | * | 8/1966 | Chamberlin | 211/11 |
| 3,270,877 | A | * | 9/1966 | Hecker | 206/564 |
| 3,330,576 | A | * | 7/1967 | Willis | 280/79.3 |
| 3,589,746 | A | * | 6/1971 | Inglis et al. | 280/79.3 |
| 3,593,370 | A | * | 7/1971 | Lapeyre | 452/106 |
| 3,780,196 | A | * | 12/1973 | Domecki | 426/393 |
| 3,908,749 | A | * | 9/1975 | Williams | 165/61 |
| 4,004,819 | A | * | 1/1977 | Brongo | 280/79.3 |
| 4,138,504 | A | * | 2/1979 | Mack et al. | 426/520 |
| 4,248,349 | A | * | 2/1981 | Locke et al. | 206/538 |
| 4,270,660 | A | * | 6/1981 | Putt | 211/85.4 |
| 4,368,840 | A | * | 1/1983 | Pardo | 206/523 |
| 4,588,096 | A | * | 5/1986 | Story et al. | 211/126.15 |
| 4,746,010 | A | * | 5/1988 | Fournier | 206/746 |
| 4,750,625 | A | * | 6/1988 | Frederick | 211/184 |
| 4,974,502 | A | * | 12/1990 | Murdock | 99/426 |
| 5,085,879 | A | * | 2/1992 | Elbaz | 426/129 |
| 5,117,777 | A | * | 6/1992 | Takasugi | 119/203 |

(Continued)

*Primary Examiner* — Joshua J Michener
*Assistant Examiner* — Devin Barnett
(74) *Attorney, Agent, or Firm* — Fay Sharpe LLP

(57) ABSTRACT

A rack and carts system to hold salmons, trouts and any other kind of similar fish, in a way that a maximum freezing capacity is reached per tunnel (kilos of frozen product per hour) as well as an excellent product presentation.

17 Claims, 5 Drawing Sheets

U.S. PATENT DOCUMENTS

| | | | |
|---|---|---|---|
| 5,125,520 A * | 6/1992 | Kawasaki | 211/133.1 |
| RE35,895 E * | 9/1998 | Bass et al. | 119/203 |
| 5,820,904 A * | 10/1998 | Mello et al. | 426/119 |
| 6,116,436 A * | 9/2000 | Ferrucci et al. | 211/187 |
| 6,203,035 B1 * | 3/2001 | Ondrasik | 280/79.3 |
| 6,244,447 B1 * | 6/2001 | Frieze et al. | 211/85.13 |
| 6,299,004 B1 * | 10/2001 | Thalenfeld et al. | 211/184 |
| 6,460,710 B1 * | 10/2002 | Dardashti | 211/184 |
| 6,572,207 B2 * | 6/2003 | Hase et al. | 312/236 |
| 6,773,081 B2 * | 8/2004 | Yuyama et al. | 312/321 |
| 6,832,544 B2 * | 12/2004 | Poarch et al. | 99/450.5 |
| 7,743,932 B2 * | 6/2010 | Lynch | 211/184 |
| 7,815,060 B2 * | 10/2010 | Iellimo | 211/151 |
| 2001/0047968 A1 * | 12/2001 | Wright | 211/41.3 |
| 2002/0027114 A1 * | 3/2002 | Krusell | 211/85.7 |
| 2003/0196975 A1 * | 10/2003 | Murray et al. | 211/126.2 |
| 2003/0205876 A1 * | 11/2003 | Orozco et al. | 280/79.3 |
| 2007/0240866 A1 * | 10/2007 | Von Feldt et al. | 165/165 |
| 2008/0113596 A1 * | 5/2008 | Hooey | 452/3 |
| 2009/0078127 A1 * | 3/2009 | McLemore et al. | 99/482 |
| 2010/0170275 A1 * | 7/2010 | Konrad et al. | 62/259.1 |

* cited by examiner

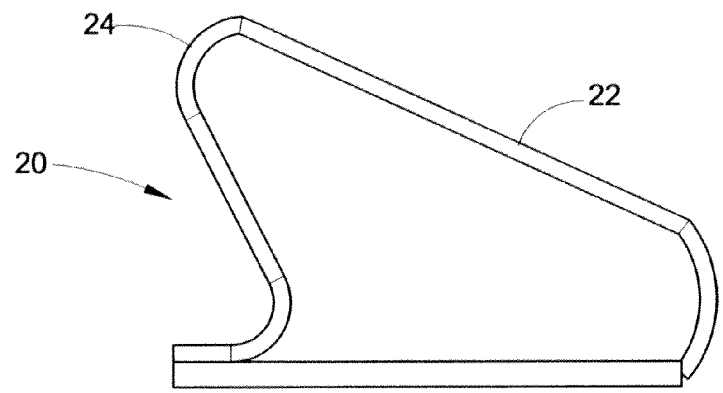
FIG. 3
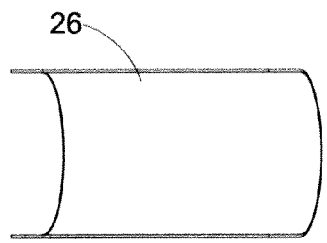
FIG. 4a
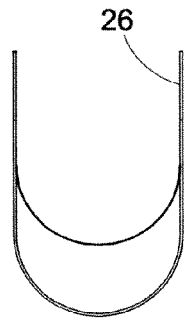    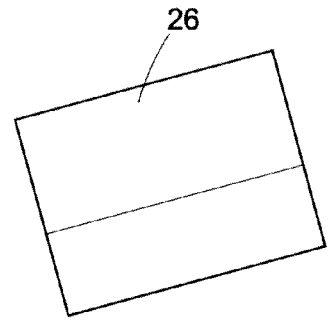    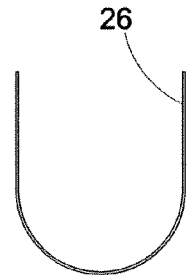
FIG. 4b        FIG. 4c        FIG. 4d

GRILL, TRAY AND CART SYSTEM TO FREEZE FOODS

This application claims priority to and the benefit of Chilean patent application no. CL 3345-08, filed Nov. 10, 2008, and entitled "Grill, tray and cart system to Freeze Foods", the entirety of which is incorporated by reference.

APPLICATION FIELD

The present invention refers to rack (trays) cart system and carts for freezing food, preferably fish, so as the products are frozen with high symmetry, also the freezing efficiency (capacity) of a semi-continuous or continuous static tunnel is maximized.

The aforementioned assures a better food presentation to the end consumer, especially in markets which reward the shape (symmetry) of the product, as for instance in Japan and, on the other hand, it allows to increase in about 30% to 40% the product nominal capacity of being frozen.

BACKGROUND OF THE INVENTION

Nowadays, there are several ways of freezing salmon, trout and other similar fish, whole gut fish, all those ways having different efficiency levels both in the freezing speed (equipment consistent capacity) and in the end-product quality (symmetry, aesthetics).

The present invention discloses a type and trays for freezing, preferably Salmon Hg type (gutted fish without head), also applicable to the freezing of any food product so as to achieve the maximum freezing capacity in a classic semi-continuous tunnel but keeping a good symmetrical and aesthetic presentation which makes it much more attractive for sophisticated markets.

Currently, in the salmon farming industry there is no plant achieving maximum freezing capacity, and at same time obtaining an impeccable product presentation, one aspect must be always compromised in order to benefit the other. By means of this innovation it is feasible to combine both aspects reaching record freezing capacity levels and a presentation which makes the end product much more attractive, especially for demanding end consumers.

In the salmon farming industry, the freezing capacity of gutted fish without head, has historically been a struggle among the systems freezing large volume of kilos per hour (productivity of the process) and those allowing the aesthetic of the end product to be impeccable (selling price maximization). There are markets which recognize the importance of the second aspect and this has resulted in that, at an industrial level the freezing capacity has been compromised for the sake of a symmetrical product accepted by those markets.

This innovation consists of a freezing system of the product which combines both aspects, that is, maximum capacity and an excellent product presentation. Once this is achieved, a substantial competitive advantage would be obtained by means of the existing alternative technology to that end, which also results in an important reduction of the freezing costs which besides making this innovation more competitive allows to reduce the required power to that end, and consequently the detrimental effect produced, by said technology in the environment.

The created technology considers a rack and carts system to hold salmons, trouts and any other kind of similar fish, in a way that a maximum freezing capacity is reached per tunnel (kilos of frozen product per hour) as well as an excellent product presentation.

DETAILED DESCRIPTION OF INVENTION

In order to carry out the previously mentioned objectives, as well as others is that according to a practical embodiment, as shown in FIG. 1, the freezing device 10 comprises the rack 12, preferably made of stainless steel in which the frame 14 supporting the hole tray 16 has a tubular shape with a square section. (FIG. 2). Inside of said frame 14, there is a series of units 18 which can serve as a base for the product to be frozen. Said structures, also preferably made of stainless steel are formed by a solid in-tube 20 which protrudes the tray 16 in a close-curve shape 22 (FIG. 3) with a protruding end 24 which supports, for instance, previously gutted fish without head. The same configuration contains a curved-laminar section 26 which can be used as a support for the tail section of a fish-like type (FIG. 4). Both the length of the support section 26 and the angle of the section 22 previously described are relative and will depend on the product to be frozen. With this Innovation, the fish are vertically arranged with respect to the ground (FIG. 5). Particularly, for freezing salmon, 9 arrangements by side are suggested of a total of 18, achieving an appropriate distance between one and the other, thus avoiding contact among the units to be frozen, which means they do not stick to each other, thus allowing that the whole mass to be frozen is uniformly and independently subject to the effects of cold, obtaining an uniform and even freezing.

The previously described curve 22 and tail support 26 configurations are arranged on the tray 14 so as the tail supports 26 are arranged (placed) inwards alternately in order to optimize the load capacity of each tray 16 (FIG. 6).

Then, on the one hand, the curved solid section 22 has a length such it allows to fit the fish or the like being held by their weight and collar bone which divides the ventral body cavity from the head zone and, on the other hand, the curved laminar surface 26 has an extension such that it allows supporting the tail or lower side of the fish or the like without leaving a mark of said support, and allowing to vertically hold the unit so as this is not laid on one of its sides.

According to one practical use of the first embodiment of the invention, the part of the curved solid 22 preferably has a length of 190 mm, while the tail support 26 preferably has a length of 100 mm and the space between them is of about 100 mm (FIG. 7) thus forming in this position a compact group which reaches 390 mm of total length. In one embodiment, the part of curved solid 22 of the solid in-tube 20 includes a diameter that is approximately 6.4 mm. Additionally, the diameter of the solid in-tube could be 9.5 mm. In another embodiment, the tail support 26 has a thickness of approximately 1 mm. The tail support 26 can be attached to the tray with an inclination angle of approximately 15 degrees.

These and other objectives, characteristics and advantages of the present invention can easily noticed in the detailed description which leads the best way of carrying out the invention when taken in combination with the attached drawings.

BRIEF DESCRIPTION OF THE DRAWINGS

FIG. 3 is a lateral view of the units which serves as a base for the product to be frozen where the solid close curved shaped in-pipe is shown.

FIG. 4a is a plan view of the laminar curved section which serves as support for a tail section of the fish-like product;

FIG. 4b is a perspective view of the laminar curved section; FIG. 4c is a lateral view of the laminar curved section; FIG. 4d is a front view of the laminar curved section.

Figure 1:
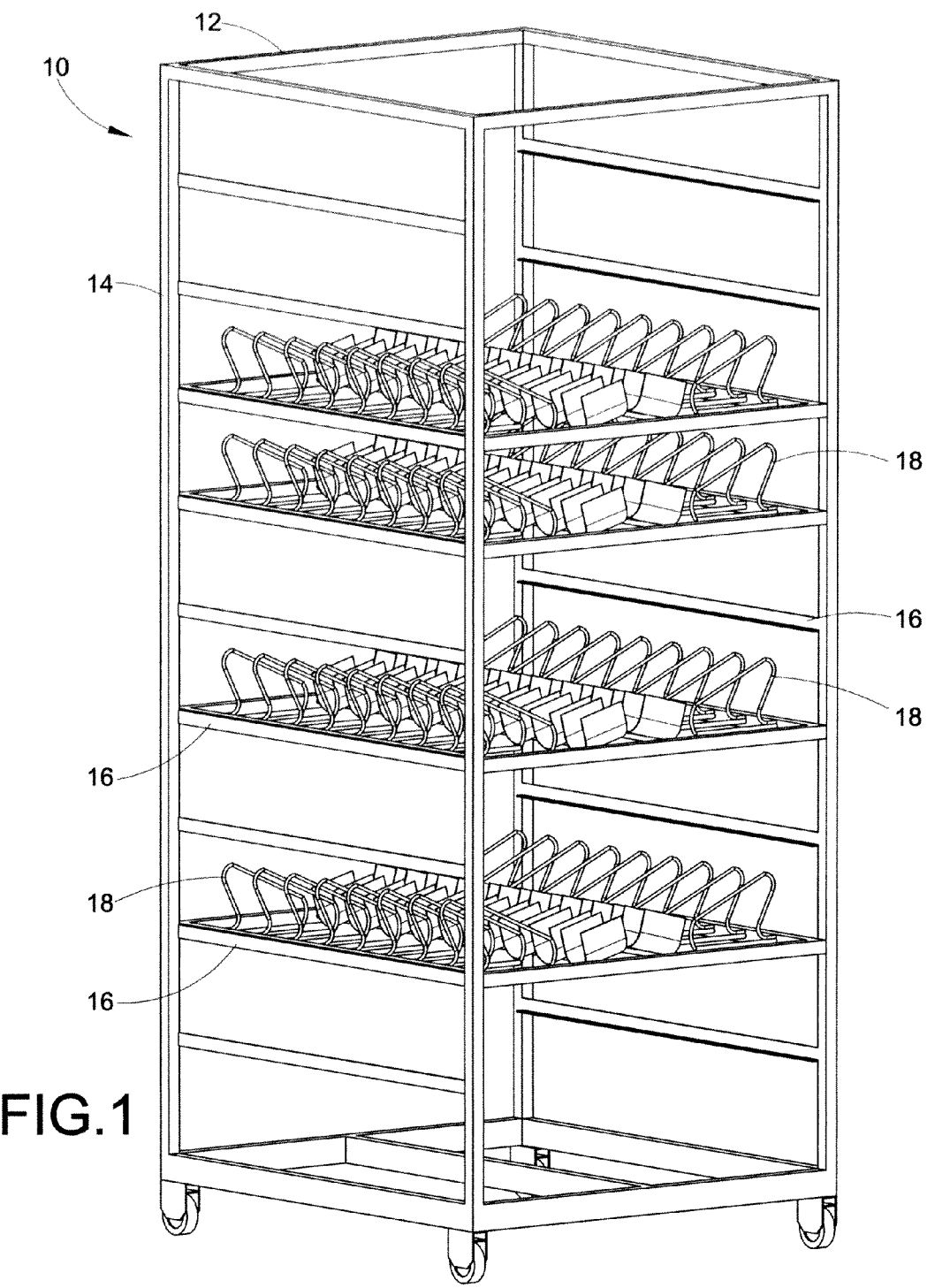
FIG. 1 is a general view of the freezing device where it is possible to notice the steel frame supporting the trays.
Figure 2:
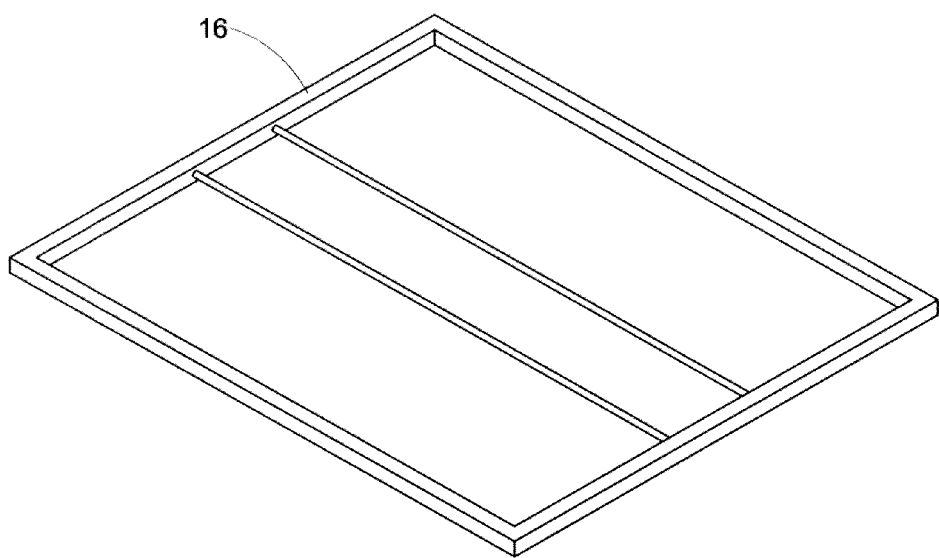
FIG. 2 is a view of the stainless steel frame of the square section cart.
Figure 5:
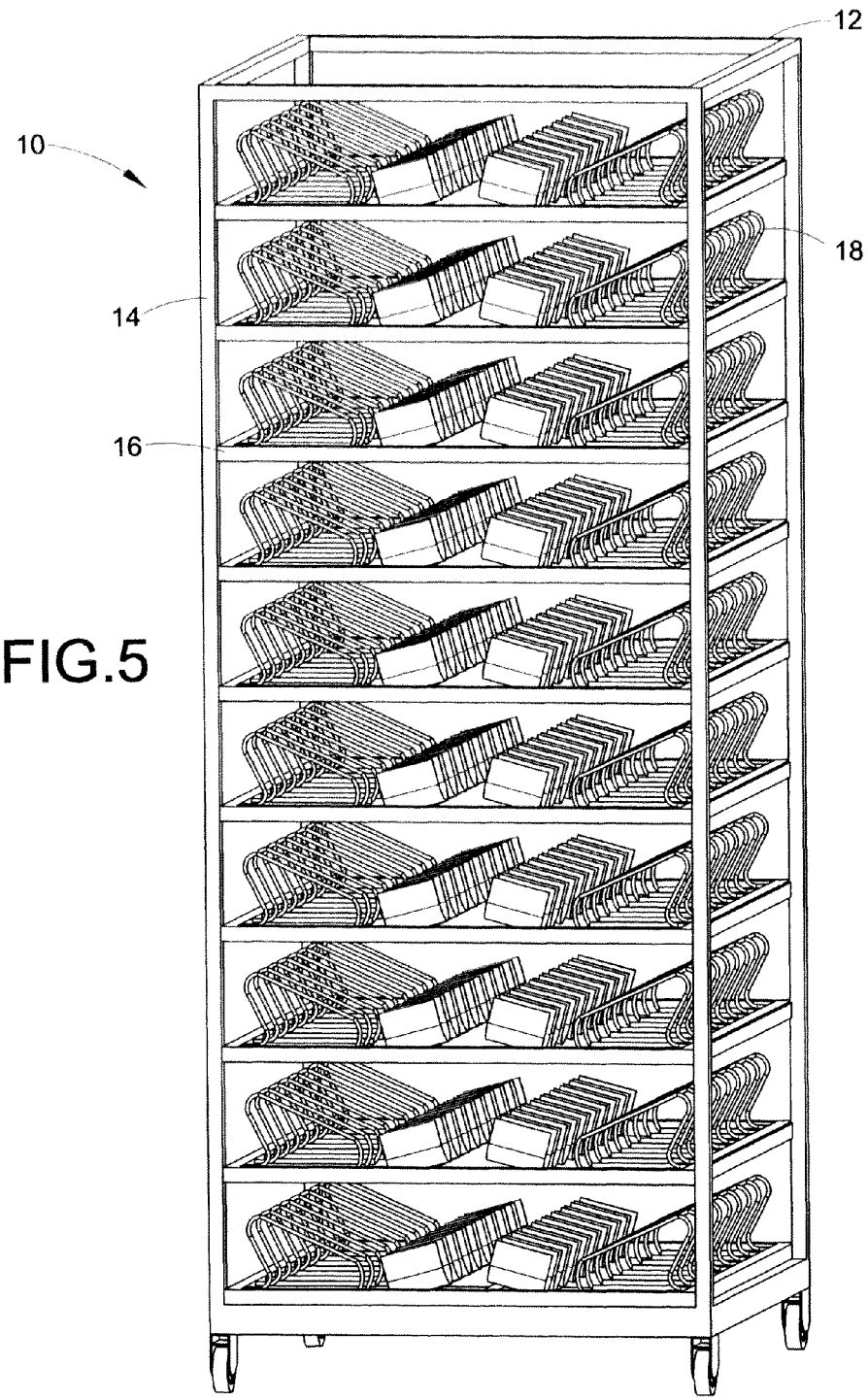
FIG. 5 shows the arrangement of the product to be frozen with respect to the ground.
Figure 6:
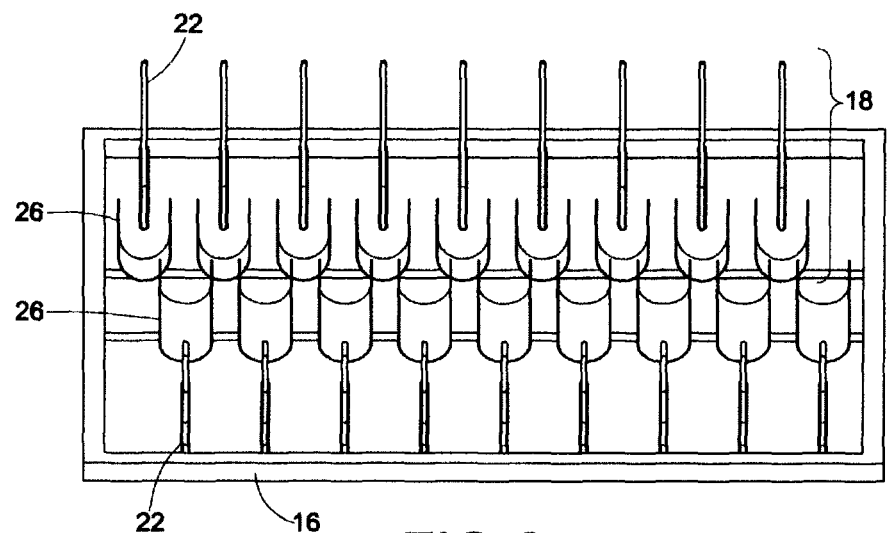
FIG. 6 is an upper view of the alternate arrangement which has to be adapted so as optimize the load capacity of each tray.
Figure 7:
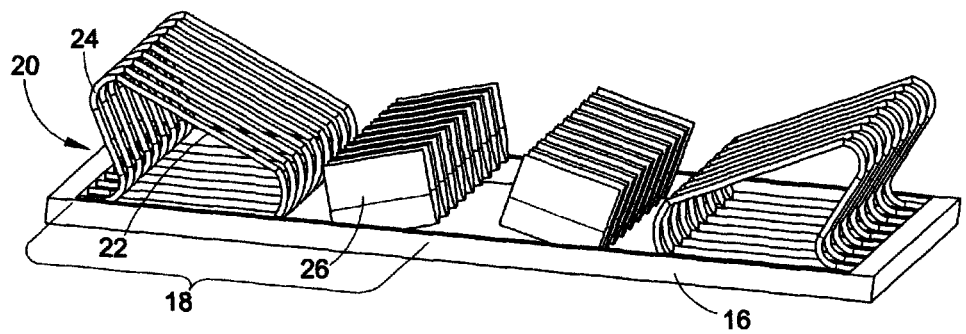
FIG. 7 is an upper view of the group formed by the curved support unit, the laminar curved section of the tail support and the space between them.

The invention claimed is:

1. A tray and cart system for freezing a food product comprising:
 a mobile cart having a frame supporting at least one tray, each tray including a plurality of unit structures to support the food product;
 each unit structure includes a tube member having an elongated orientation with a close-curve shape and an inclined curved-laminar section which is aligned with and spaced apart from said tube member; each curved laminar section having a base side with a first arm and a second arm extending from opposite ends of the base side in generally upward U-shaped configuration, the base side of each curved laminar section is attached to a corresponding tray such that the first arm and the second arm extend upwardly from the corresponding tray, wherein each said tube member has a base portion which includes a longitudinal axis that is generally centrally aligned with a longitudinal axis of each said inclined curved laminar section: wherein each said unit structure is configured for a fish to be placed on the unit structure with a fish tail end resting within the curved laminar section and frozen with high symmetry, maximizing the efficiency and capacity of the freezing of a semi-continuous or continuous static tunnel.

2. The tray and cart system of claim 1 wherein each said unit is adapted to support a gutted fish.

3. The tray and cart system of claim 1 wherein each tube member includes a protruding end that is vertically spaced from the corresponding tray.

4. The tray and cart system of claim 1 wherein the plurality of unit structures are vertically arranged with respect to a ground in a side by side orientation.

5. The tray and cart system of claim 1 wherein each tray includes an outer edge that defines the shape of each tray and the plurality of unit structures are supported by the corresponding tray such that the curved-laminar sections are arranged inwards of the outer edge.

6. The tray and cart system of claim 5 wherein the outer edge of each tray outlines a generally rectangular shape.

7. The tray and cart system of claim 6 wherein the plurality of unit structures of are aligned in a side by side orientation.

8. The tray and cart system of claim 1 wherein the plurality of unit structures are aligned in a first series and a second series such that the curved-laminar sections of the first series are positioned adjacent the curved laminar sections of the second series.

9. The tray and cart system of claim 8 wherein the plurality of unit structures in the first series are aligned with the plurality of unit structures in the second series.

10. A tray and cart assembly for supporting an associated fish product comprising:
 a rack having a frame supporting at least one tray;
 a plurality of unit structures are operably attached to each tray and aligned in a side by side orientation to support the fish product;
 each unit structure includes an elongated curved tube member that is adapted to support a fish body of the fish product and a curved tail support laminar section: said curved tail support having a generally upward U-shaped configuration and a support surface having a first edge and a spaced second edge that is inclined relative to a corresponding tray, the first edge is spaced further from the corresponding tray than the second edge which is attached directly to the corresponding tray, wherein each said tube member has a base portion which includes a longitudinal axis that is generally centrally aligned with a longitudinal axis of each said curved tail support; and
 each curved tail support is adapted to support a tail section of the fish product such that the fish product can be placed on each unit structure and frozen with high symmetry, maximizing the efficiency and capacity of the freezing of a semi-continuous or continuous static tunnel.

11. The tray and cart assembly of claim 10 wherein said plurality of unit structures include nine (9) unit structures that are attached to each tray on a first side and nine (9) unit structures at attached to each tray on a second side.

12. The tray and cart assembly of claim 10 wherein each elongated curved tube member is attached to the corresponding tray at a first point and each curved tail support is attached to the corresponding tray at a second point such that the first position is spaced from the second position a predetermined amount.

13. The tray and cart assembly of claim 12 wherein each tray includes an outer edge such that the first position is adjacent the outer edge and the second position is oriented inwardly from the outer edge.

14. The tray and cart assembly of claim 12 wherein the predetermined amount is approximately 100 mm.

15. The tray and cart assembly of claim 10 wherein each elongated curved tube member has a length of approximately 190 mm.

16. The tray and cart assembly of claim 10 wherein each curved tail support has a length of approximately 100 mm.

17. The tray and cart assembly of claim 10 wherein at least one of the rack, each tray and the unit structures are comprised of a stainless steel material.

* * * * *